United States Patent
Lindley

(10) Patent No.: US 9,203,790 B2
(45) Date of Patent: Dec. 1, 2015

(54) METHOD, SYSTEM AND COMPUTER PROGRAM PRODUCT FOR CONTROLLED NETWORKED COMMUNICATION

(71) Applicant: Michael Lindley, Rancho Mirage, CA (US)

(72) Inventor: Michael Lindley, Rancho Mirage, CA (US)

(73) Assignee: SOCON MEDIA, INC., Colorado Springs, CO (US)

( * ) Notice: Subject to any disclaimer, the term of this patent is extended or adjusted under 35 U.S.C. 154(b) by 0 days.

(21) Appl. No.: 13/756,286

(22) Filed: Jan. 31, 2013

(65) Prior Publication Data

US 2015/0012591 A1  Jan. 8, 2015

Related U.S. Application Data

(63) Continuation-in-part of application No. 12/854,889, filed on Aug. 11, 2010.

(51) Int. Cl.
| | | |
|---|---|---|
| G06F 3/00 | (2006.01) | |
| H04L 12/58 | (2006.01) | |
| H04L 29/08 | (2006.01) | |
| G09B 7/02 | (2006.01) | |
| H04L 12/18 | (2006.01) | |
| G09B 5/06 | (2006.01) | |
| G06F 3/048 | (2013.01) | |

(52) U.S. Cl.
CPC  *H04L 51/10* (2013.01); *G09B 5/06* (2013.01); *G09B 7/02* (2013.01); *H04L 12/1818* (2013.01); *H04L 67/10* (2013.01)

(58) Field of Classification Search
CPC .... G06Q 50/01; G06Q 10/101; G06Q 10/103
See application file for complete search history.

(56) References Cited

U.S. PATENT DOCUMENTS

| | | | |
|---|---|---|---|
| 2003/0027121 A1* | 2/2003 | Grudnitski et al. | 434/308 |
| 2007/0078930 A1* | 4/2007 | Ludwig et al. | 709/204 |
| 2010/0205537 A1* | 8/2010 | Knighton et al. | 715/751 |
| 2010/0229085 A1* | 9/2010 | Nelson et al. | 715/255 |
| 2010/0241972 A1* | 9/2010 | Spataro et al. | 715/753 |
| 2010/0332404 A1* | 12/2010 | Valin | 705/310 |
| 2011/0167353 A1* | 7/2011 | Grosz et al. | 715/738 |
| 2011/0239129 A1* | 9/2011 | Kummerfeld et al. | 715/750 |

* cited by examiner

*Primary Examiner* — Nicholas Augustine
(74) *Attorney, Agent, or Firm* — Fitzpatrick PC; William Fitzpatrick

(57) ABSTRACT

A system for communication over a network is provided. The system has a module in communication with an application and the network, wherein the module is configured to create an event using an application, wherein the event comprises a first media upload by a first authorized user, receive permission from the first authorized user to transmit the event, store, on a server, the first media upload, transmit the first upload media to a second user in an authorized group of users upon request by the second user, wherein the transmission is permitted only for a first predetermined amount time, receive, at the server, a second media upload from the second authorized user in response to the first media upload and store, on a server, the second media upload until the first authorized party is ready to view the second media upload, wherein the server is configured to store the second media upload for a second predetermined amount of time. A method for communication over a network is also provided.

8 Claims, 21 Drawing Sheets

200

User Identification [          ]
Password [          ]

Create Account          [ Submit ]

Email [          ]
First Name [          ]
Last Name [          ]
Address [          ]
City [          ]
State [  ] Zip [      ]
Country [          ]
Phone [          ]

Credit Card Type   ○ Type #1  ○ Type #2  ○ Type #3  ○ Type #4

Credit Card # [              ]   Exp. [  ]  Year [  ]
                                 Month

| Group | Group Description | Request to Join |
|---|---|---|
| | Group Search Results | |
| Group #1 | Group #1 Description | ☐ |
| . | . | ☐ |
| . | . | ☐ |
| . | . | ☐ |
| | | ☐ |
| | | ☐ |
| | | ☐ |
| | | ☐ |
| | | ☐ |
| Group #n | Group #n Description | ☐ |

Submit

Requests to Join Event #n

| User Identification | Event Description | Grant Membership | Decline Membership |
|---|---|---|---|
| User #1 | User #1 Description | ○ | ○ |
| ⋮ | ⋮ | ○ | ○ |
| | | ○ | ○ |
| | | ○ | ○ |
| | | ○ | ○ |
| | | ○ | ○ |
| | | ○ | ○ |
| User #n | User #n Description | ○ | ○ |

Submit

| Event | Event Description | Request to View | Request to Join |
|---|---|---|---|
| Event #1 | Event #1 Description | ○ | ○ |
| ⋮ | ⋮ | ○ | ○ |
| | | ○ | ○ |
| | | ○ | ○ |
| | | ○ | ○ |
| | | ○ | ○ |
| | | ○ | ○ |
| Event #n | Event #n Description | ○ | ○ |

Event Search Results

Submit

Requests to Join Event #n

| User Identification | Event Description | Grant Access | Decline Access |
|---|---|---|---|
| Event #1 | Event #1 Description | ○ | ○ |
| . | . | ○ | ○ |
| . | . | ○ | ○ |
|  |  | ○ | ○ |
|  |  | ○ | ○ |
|  |  | ○ | ○ |
|  |  | ○ | ○ |
| Event #n | Event #n Description | ○ | ○ |

Submit

Requests to View Event #n

| User Identification | User Description | Grant Access | Decline Access |
|---|---|---|---|
| User #1 | User #1 Description | O | O |
| . | . | O | O |
| . | . | O | O |
| . | . | O | O |
| | | O | O |
| | | O | O |
| | | O | O |
| | | O | O |
| User #n | User #n Description | O | O |

Submit

| Event | Event Description | View or Start |
|---|---|---|
| Event #1 | Event #1 Description | View |
| . | . | . |
| . | . | . |
| . | . | . |
| Event #n | Event #n Description | Start |

Event Status

Submit

FIG. 10

METHOD, SYSTEM AND COMPUTER PROGRAM PRODUCT FOR CONTROLLED NETWORKED COMMUNICATION

CROSS-REFERENCE TO RELATED APPLICATIONS

The present Utility application claims the benefit of the earlier filing date, pursuant to 35 USC 120, as a continuation-in-part to that patent application filed in the US Patent and Trademark Office on, entitled "A Method, System and Computer Program Product for Conducting Formal Debates," U.S. Ser. No. 12/854,889, the contents of which are incorporated by reference, herein.

The aforementioned Utility patent application claimed the priority benefit of the U.S. provisional application for patent Ser. No. 61/318,140 filed on Mar. 26, 2010 entitled A System and Method for Online Interaction under 35 U.S.C. 119(e). The contents of this related provisional application are incorporated herein by reference for all purposes.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to globally networked interaction. More particularly, the invention relates to controlled, asynchronous and time lapsed communication over a network.

BACKGROUND OF THE INVENTION

The development of the Internet and wireless protocol has led to a vast increase in human interaction via video conferencing, social networking, blogging, and other network applications. This has allowed people in various parts of the world to communicate on both formal and informal levels.

Globalization and international integration over the past century has led to a vast increase in corporate growth and wealth. A vast majority of public companies are now multinational corporations or multinational enterprises that operate in multiple countries across literally every time zone on the globe. One such company may host, in different parts of the world, hundreds or even thousands of conferences, meetings, and events each day. As used herein, the term "event" is meant to include conferences and meetings. Further, these terms may be used interchangeably to describe any event.

Due to the constraints of geography, it has become increasingly difficult to effectively communicate with chosen or predetermined members of an organization, while receiving feedback from these same members in an organized and effective way.

For example, in the aforementioned related application, in the context of formal debates, the difficulties in conventional in-person/face-to-face debates are described; face-to-face formal debates can be very expensive, as debate participants or their sponsors must pay travel and lodging expenses. Travel requirements for face-to-face formal debates can also be very time consuming. Organizing and building a debate group for conventional face-to-face formal debates can also be very difficult as participants may be located in geographically different regions.

The same is true for multinational corporations and enterprises. Many times, integral members of a management or certain persons on sales teams are located in vastly different time zones such that it is impossible to communicate effectively during normal business hours. For example, a meeting or large conference may be taking place in New York on Eastern Standard Time (EST) 10:00 AM while an integral party may be in located in Sydney where the conference would take place at 2:00 AM. In this circumstance, video conferencing and other known modes of communication are inconvenient at best, and counter-productive at worst. Further, these known modes of communication do not enable robust interaction between the parties, nor do they allow for any type of controls, regulations or guidelines.

Accordingly, no suitable system or method for global asynchronous communication exists.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a detailed block diagram depicting an exemplary client/server system which may be used by an exemplary web-enabled/networked embodiment of the present invention FIG. 3A illustrates an exemplary user interface screen which may be used by an exemplary web-enabled embodiment of the present invention for entering user identification information;

FIG. 3B illustrates another an exemplary user interface screen which may be used by an exemplary web-enabled embodiment of the present invention for entering user identification information;

FIG. 4 illustrates an exemplary user interface screen which may be used by an exemplary web-enabled embodiment of the present invention for creating a new group or for finding and selecting a group or teams with intent of joining;

FIG. 5 illustrates an exemplary user interface screen which may be used by an exemplary web-enabled embodiment of the present invention for requesting to join an event;

FIG. 6A illustrates an exemplary user interface screen which may be used by an exemplary web-enabled embodiment of the present invention for creating a new event or for finding and selecting a events or events with intent of joining;

FIG. 6B illustrates another exemplary user interface screen which may be used by an exemplary web-enabled embodiment of the present invention for creating a new event or for finding and selecting a events or events with intent of joining FIG. 7 illustrates an exemplary user interface screen which may be used by an exemplary web-enabled embodiment of the present invention for displaying events search results and for selecting to view or join an event or events;

FIG. 8 illustrates an exemplary user interface screen which may be used by an exemplary web-enabled embodiment of the present invention for displaying requests to join an event and for granting or declining access to join an event\

FIG. 9 illustrates an exemplary user interface screen which may be used by an exemplary web-enabled embodiment of the present invention for displaying requests to view a event and for granting or declining access to view a event;

FIG. 10 illustrates an exemplary user interface screen which may be used by an exemplary web-enabled embodiment of the present invention for displaying conference status and for selecting to view or begin participation in a conference;

Figure 1:
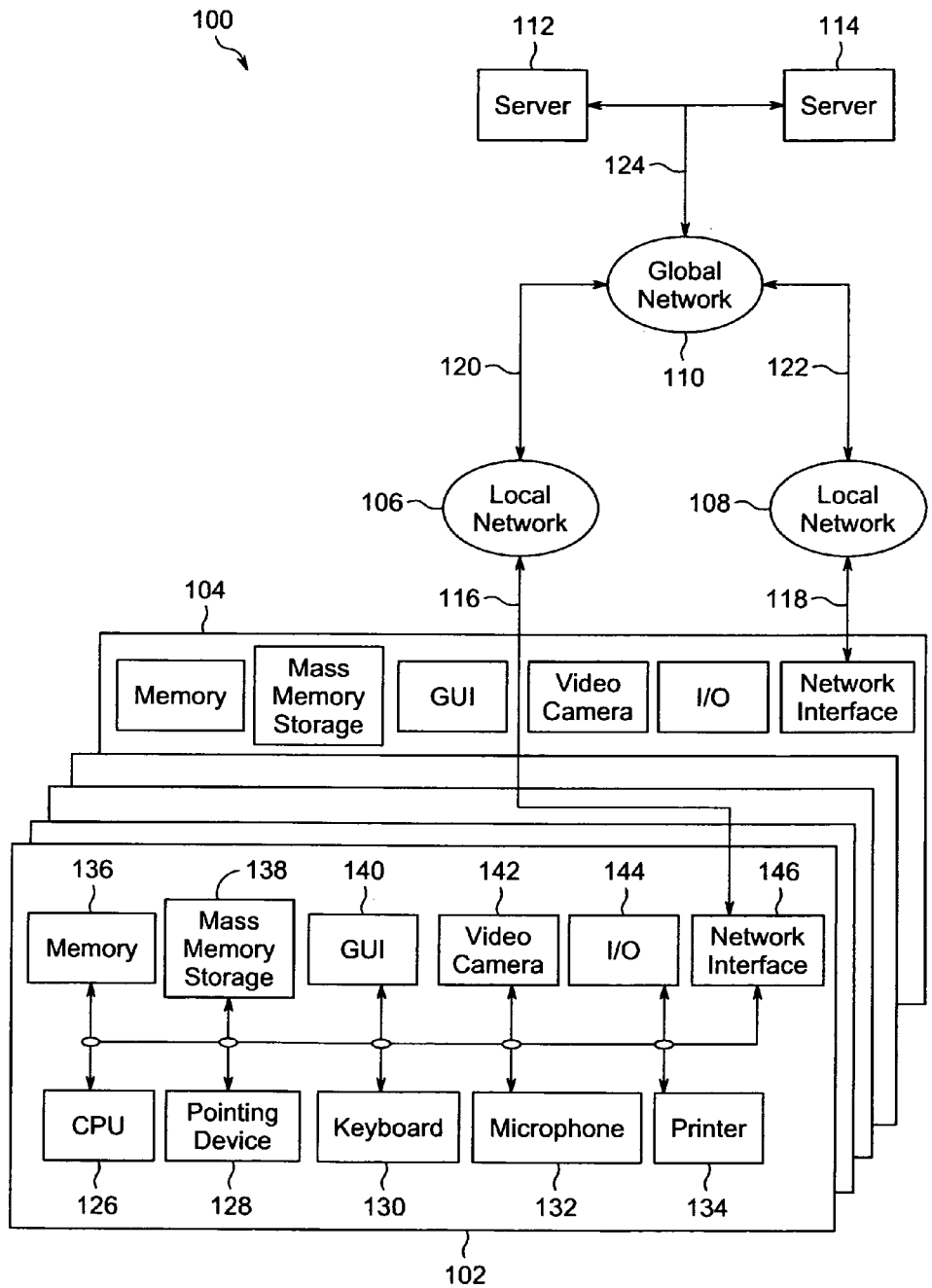
FIG. 1 is a block diagram depicting an exemplary client/server system which may be used by an exemplary web-enabled/networked embodiment of the present invention.

Unless otherwise indicated illustrations in the figures are not necessarily drawn to scale.

SUMMARY OF THE INVENTION

In an embodiment of the present invention, a system for communication over a network, the system comprising a module in communication with an application and the network, wherein the module is configured to create an event using an application, wherein the event comprises a first media upload by a first authorized user; receive permission from the first authorized user to transmit the event; store, on a server, the first media upload; transmit the first upload media to a second user in an authorized group of users upon request by the second user, wherein the transmission is permitted only for a first predetermined amount time; receive, at the server, a second media upload from the second authorized user in response to the first media upload; store, on a server, the second media upload until the first authorized party is ready to view the second media upload, wherein the server is configured to store the second media upload for a second predetermined amount of time.

In a second embodiment, a method for controlled communication over a network executed by one or more computing processors, the method comprising creating an event using an application, wherein the event comprises a first media upload created by a first authorized user; receiving permission from the first authorized user to transmit the event; storing, on a server, the first media upload; transmitting the first upload media to a second user in an authorized group of users upon request by the second user, wherein the transmission is permitted only for a first predetermined amount time; and receiving, at the server, a second media upload from the second authorized user in response to the first media upload; storing, on a server, the second media upload until the first authorized party is ready to view the second media upload, wherein the server is configured to store the second media upload for a second predetermined amount of time.

To achieve the forgoing and other aspects and in accordance with the purpose of the invention, a method, system and computer program product for conducting formal conferences is presented.

Other features, advantages, and aspects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

Features which are described in the context of separate embodiments may also be provided in combination in a single embodiment. Conversely, various features which are, for brevity, described in the context of a single embodiment, may also be provided separately or in any suitable sub-combination. The Applicants hereby give notice that new Claims may be formulated to such features and/or combinations of such features during the prosecution of the present application or of any further application derived therefrom.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

A first embodiment of the present invention will be described which provides means and methods for providing online interaction between parties with interaction controlled by a predetermined set of rules. Non-limiting examples of predetermined rules include time limits, operational methods and media constraints. The interaction between parties may include any known media type. Non-limiting examples of media types include audios, videos, pictures, images and textual information. The media exchanged in the interaction between the parties may be original content created by the parties or may be created by other entities.

In embodiments of the present invention, the examples described herein relate to mobile communication via smartphone. It should be appreciated that smart phones may include personal digital assistants, tablet devices, e-readers, wireless music devices and any other personal computing device such as desktops and laptops, which includes at least one of a display, processor, memory or input or output means, together with any electronic device that is used as a platform for audio-visual media and web content. Additional information may be attached or linked to the media for purposes of furthering the interaction between the parties. Non-limiting examples of additional information which may be attached or linked include videos, audios and text, comments, and statements of clarification.

In embodiments of the present invention, the users may create accounts on their smartphones. Non-limiting examples of mechanisms which a user seeking to operate an embodiment or embodiments of the present invention may be provided include creating an account, logging into an account, creating a meeting or conference, creating a new group, requesting to join a group, searching for a group, accepting or rejecting applicants for a group, requesting to join or view a conference, creating a new conference or conferences, searching for a conference or conferences, requesting to join a conference, accepting or rejecting applicants to a conference, accepting or rejecting applications to view a conference, uploading media, downloading media, viewing media and voting. As used herein, the term "conference" is meant to include any type of event, including but limited to meetings, assemblies, summits, gatherings, congregations, and the like. Non-limiting examples of mechanisms for interfacing with embodiments of the present invention include Graphical User Interface (GUI), computer keypad, computer pointing device, mobile device display, mobile device keypad.

As used herein, the term "conference" or "event" is further meant to include any audio or video that is intended for a group of persons, whether they are viewing the audio/video in a "live" format or as mobile audio/video sometime thereafter. A conference may include an academic conference, business conference, news conference, settlement conference, or trade conference.

FIG. 1 is a block diagram depicting an exemplary client/server system which may be used by an exemplary web-enabled/networked embodiment of the present invention. This embodiment, in particular, applies to users with access to desktop and or laptop computers. However, other exemplary embodiments are for use with mobile devices (e.g., smartphones).

A communication system 100 includes a plethora of clients with a sampling of clients denoted as a client 102 and a client 104, a plethora of local networks with a sampling of multiple processors. CPU 126 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 136 is used typically to transfer data and instructions to CPU 126 in a bi-directional manner. Memory 136, as discussed previously, may include any suitable computer-readable media, intended for data storage, such as those described above excluding any wired or wireless transmissions unless specifically noted. Mass memory storage 138 may also be coupled bi-directionally to CPU 126 and provides additional data storage capacity and may include any of the computer-readable media described above. Mass memory storage 138 may be used to store programs, data and the like and is typically a secondary storage medium such as a hard disk. It will be appreciated that the information retained within mass memory storage 138, may, in appropriate cases, be incorporated in standard fashion as part of memory 136 as virtual memory.

CPU 126 may be coupled to GUI 140. GUI 140 enables a user to view the operation of computer operating system and software. CPU 126 may be coupled to pointing device 128. Non-limiting examples of pointing device 128 include computer mouse, trackball and touchpad. Pointing device 128 enables a user with the capability to maneuver a computer cursor about the viewing area of GUI 140 and select areas or features in the viewing area of GUI 140. CPU 126 may be coupled to keyboard 130.

Keyboard 130 enables a user with the capability to input alphanumeric textual information to CPU 126. CPU 126 may be coupled to microphone 132. Microphone 132 enables audio produced by a user to be recorded, processed and communicated by CPU 126. CPU 126 may be connected to video camera 142. Video camera 142 enables video produced or captured by user to be recorded, processed and communicated by CPU 126. In exemplary embodiment in which a smartphone is the preferred mode of communication, the phones built in video/audio recorder may be used.

CPU 126 may also be coupled to input/output interface 144 that connects to one or more input/output devices such as such as CD-ROM, video monitors, track balls, mice, keyboards, microphones, touch-sensitive displays, transducer card readers, magnetic or paper networks denoted as a local network 106 and a local network 108, a global network 110 and a plethora of servers with a sampling of servers denoted as a server 112 and a server 114.

Client 102 may communicate bi-directionally with local network 106 via a communication channel 116. Client 104 may communicate bi-directionally with local network 108 via a communication channel 118. Local network 106 may communicate bi-directionally with global network 110 via a communication channel 120. Local network 108 may communicate bi-directionally with global network 110 via a communication channel 122. Global network 110 may communicate bi-directionally with server 112 and server 114 via a communication channel 124. Server 112 and server 114 may communicate bi-directionally with each other via communication channel 124. Furthermore, clients 102, 104, local networks 106, 108, global network 110 and servers 112, 114 may each communicate bi-directionally with each other. There are also generally one or more gateways (not shown) connecting the local networks 106 and the servers 112 to the global network 110.

In one embodiment, global network 110 may operate as the Internet. It will be understood by those skilled in the art that communication system 100 may take many different forms. Non-limiting examples of forms for communication system 100 include local area networks (LANs), wide area networks (WANs), wired telephone networks, wireless networks, or any other network supporting data communication between respective entities.

Clients 102 and 104 may take many different forms. Non-limiting examples of clients 102 and 104 include personal computers, personal digital assistants (PDAs), cellular phones and smartphones.

Client 102 includes a CPU 126, a pointing device 128, a keyboard 130, a microphone 132, a printer 134, a memory 136, mass memory storage 138, a GUI 140, a video camera 142, an input/output interface 144 and a network interface 146. The client may also include removable media devices (not shown), such as CDs, DVDs, memory cards, etc.

CPU 126, pointing device 128, keyboard 130, microphone 132, printer 134, memory 136, mass memory storage 138, GUI 140, video camera 142, input/output interface 144 and network interface 146 may communicate in a unidirectional manner or a bi-directional manner with each other via a communication channel 148.

Communication channel 148 may be configured as a single communication channel or a plethora of communication channels. CPU 126 may be comprised of a single processor or tape readers, tablets, styluses, voice or handwriting recognizers, or other well-known input devices such as, of course, other computers.

Finally, CPU 126 optionally may be coupled to network interface 146 which enables communication with an external device such as a database or a computer or telecommunications or interne network using an external connection shown generally as communication channel 116, which may be implemented as a hardwired or wireless communications link using suitable conventional technologies. With such a connection, CPU 126 might receive information from the network, or might output information to a network in the course of performing the method steps described in the teachings of the present invention.

FIG. 2 illustrates an exemplary user interface screen 200 which may be used by an exemplary smartphone-enabled or web-enabled embodiment of the present invention for entering user identification information.

User interface screen 200 may operate to allow a user to enter personal information, account information and other related information for creating or accessing an account. Non-limiting examples of information which may be entered include user identification, password, email address, first name, last name, address, city, state, zip code, country, telephone number, credit card type, credit card number credit card month and year of expiration. User interface screen 200 may operate to allow a user to control the operation of user interface screen 200 via menu and selection buttons. Non-limiting examples of menu and selection buttons include file, edit, view, and window and help menu selections and minimize screen, expand-to-full-screen, and close screen and submit selection.

Figures 3A, 3B:
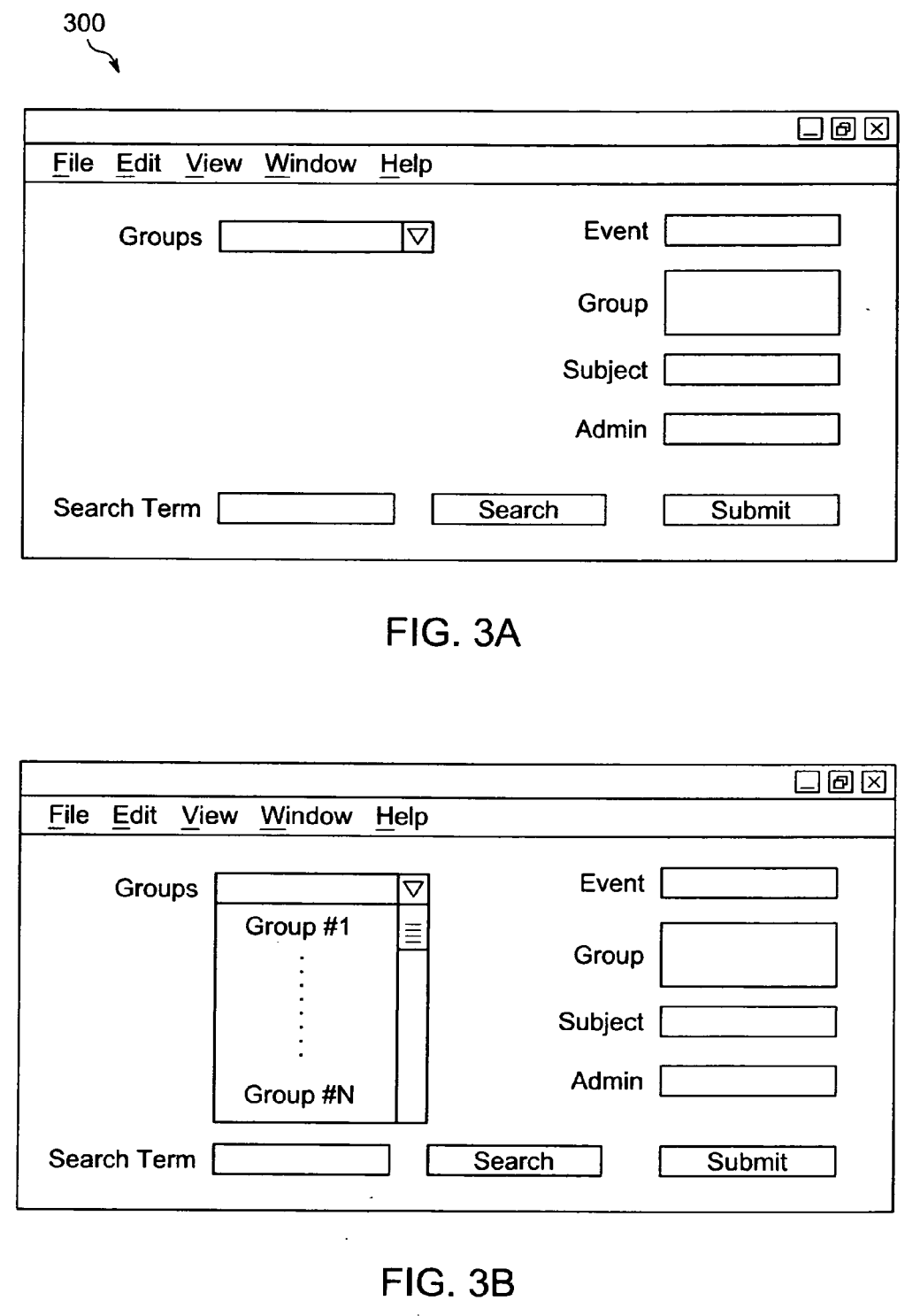

FIGS. 3A-B illustrates an exemplary user interface screen 300 which may be used by an exemplary smart-phone enabled or web-enabled embodiment of the present invention for creating a new event or conference or for finding and selecting a group or groups with intent of joining. For example, a group may comprise marketing or sales teams, or a territory or business group.

User interface 300 may operate to allow the Admin to create a new group, search for a group, or request a Chair to schedule a meeting. Non-limiting examples of information which may be entered or selected include team, description, parameters and search terms. User interface screen 300 may operate to allow a user to control the operation of user interface screen 300 via menu and selection buttons. Non-limiting examples of menu and selection buttons include file, edit, view, window and help menu selections and minimize screen, expand-to-full-screen, close screen, search and submit selection.

FIG. 4 illustrates an exemplary user interface screen 400 which may be used by an exemplary web-enabled embodiment of the present invention for requesting to join a group event. For example, in some embodiment, a user who is not an Admin or Chair may request to join an event of conference. In this embodiment, the user may search for an event using keywords (e.g., "sales meeting" and turbines) to find meetings or conferences for the turbines sales team. If the user finds the meeting he or she is looking for, the user may request to join. The Admin may then check the user's permissions and allow or disallow this person access to the video conference. In an optional embodiment of the present invention, the system may check a user's permissions to determine whether the conference viewing should be granted.

User interface screen 400 may operate to allow a user to view a list of events or conferences as a result of a search and to allow a user to request to join an event or conference. Non-limiting examples of information which may be displayed include event names and event descriptions and selection boxes for selecting to request to join an event. User interface screen 400 may operate to allow a user to control the operation of user interface screen 400 via menu and selection buttons. Non-limiting examples of menu and selection buttons include file, edit, view, window and help menu selections and minimize screen, expand-to-full-screen, close screen and submit selection.

FIG. 5 illustrates an exemplary user interface screen 500 which may be used by an exemplary web-enabled embodiment of the present invention for granting or declining a meetings requestor. User interface 500 may operate to allow the Admin to grant or decline another user's request to join a team. Non-limiting examples of information which may be displayed include user identifications, user descriptions and radio selections for granting or declining requests to join a team. User interface screen 500 may operate to allow a user to control the operation of user interface screen 500 via menu and selection buttons. Non-limiting examples of menu and selection buttons include file, edit, view, window and help menu selections and minimize screen, expand-to-full-screen, close screen and submit selection.

Figures 6A, 6B:
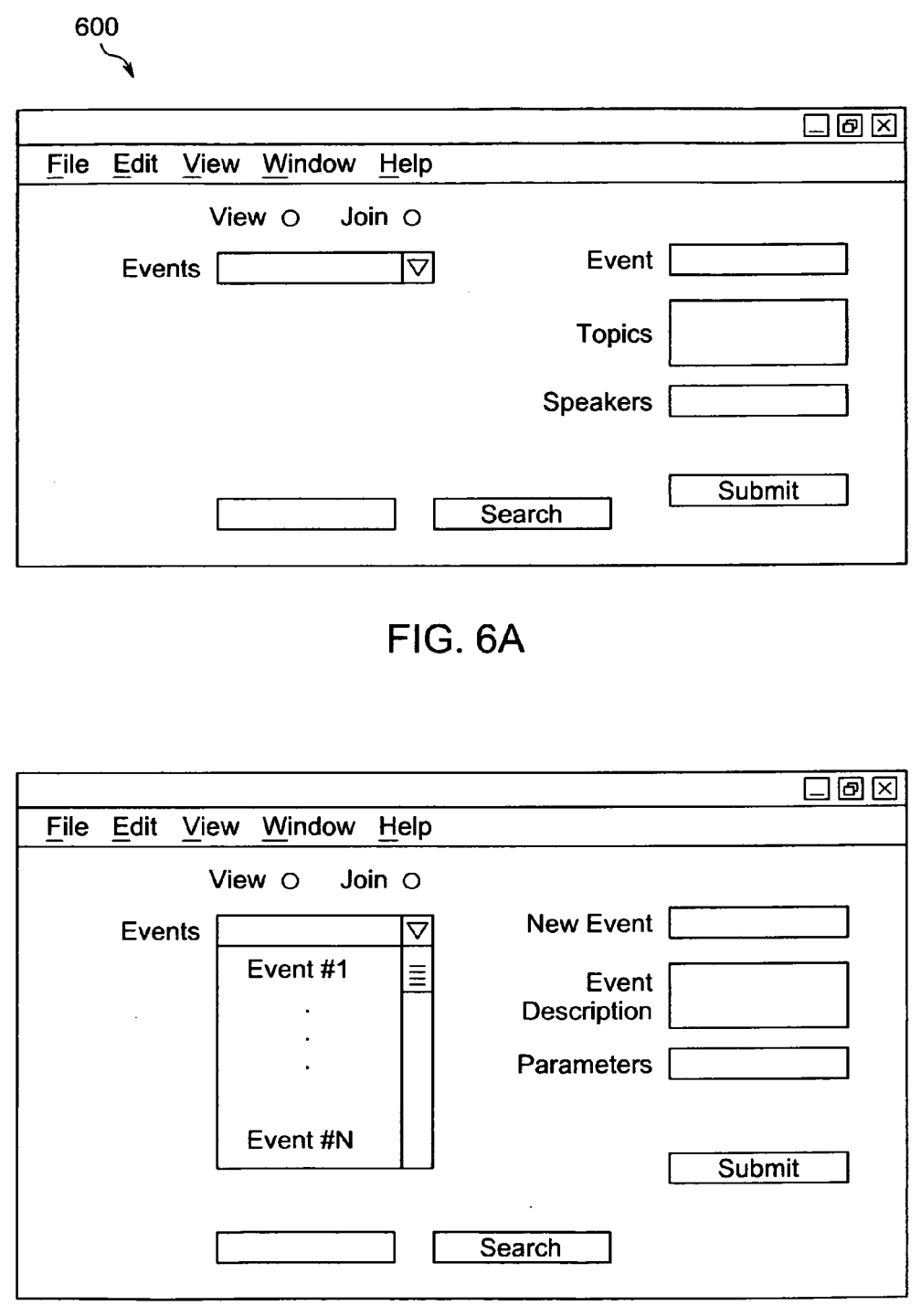

FIGS. 6A-B illustrates an exemplary user interface screen 600 which may be used by an exemplary smart phone or web-enabled embodiment of the present invention for creating a new conference or for finding and selecting a conference or conferences with intent of joining.

User interface 600 may operate to allow an Admin to create a new event or conference. Non-limiting examples of information which may be entered or selected include conference, selection to view or join, new conference name, conference description, conference related parameters and search parameters. Admin interface screen 600 may operate to allow a user to control the operation of user interface screen 600 via menu and selection buttons. Non-limiting examples of menu and selection buttons include file, edit, view, window and help menu selections and minimize screen, expand-to-full-screen, close screen, search and submit selection.

FIG. 7 illustrates an exemplary user interface screen 700 which may be used by an exemplary smart-phone or web-enabled embodiment of the present invention for displaying event or conference search results and for selecting to view or join a conference or conferences.

User interface 700 may operate to allow a user to view information related to a search for a conference and select to view or join an event or conferences. Non-limiting examples of information which may be displayed include conference name, conference description and selections for requesting to view or join a conference. User interface screen 700 may operate to allow a user to control the operation of user interface screen 700 via menu and selection buttons. Non-limiting examples of menu and selection buttons include file, edit, view, window and help menu selections and minimize screen, expand-to-full-screen, close screen and submit selection.

FIG. 8 illustrates an exemplary user interface screen 800 which may be used by an exemplary web-enabled embodiment of the present invention for displaying requests to join an event or conferences and for granting or declining access to join a conference or conferences.

User interface screen 800 may operate to allow a user to view requests for joining a conference and allow user to grant or decline access to an event or conference by a requesting to join an event. Non-limiting examples of information which may be displayed include event name, event description and radio selections for selecting to grant or decline a user to an event.

FIG. 9 illustrates an exemplary user interface screen 900 which may be used by an exemplary smart-phone or web-enabled embodiment of the present invention for displaying requests to view a conference or conferences and for granting or declining access to view a conference or conferences.

User interface screen 900 may operate to allow a user to view requests for viewing a conference and allow user to grant or decline access to view conference by a requesting group or teams. Non-limiting examples of information which may be displayed include conference name, conference description and radio selections for selecting to grant or decline a conference or teams access to view a conference. User interface screen 900 may operate to allow a user to control the operation of user interface screen 900 via menu and selection buttons. Non-limiting examples of menu and selection buttons include file, edit, view, window and help menu selections and minimize screen, expand-to-full-screen, close screen and submit selection.

FIG. 10 illustrates an exemplary user interface screen 1000 which may be used by an exemplary smart-phone or web-enabled embodiment of the present invention for displaying an event or conference status and for selecting to view or begin participation in a conference or event. User interface screen 1000 may operate to allow a user to view conference status. Non-limiting examples of information which may be displayed include conference name, conference description and selection button for initiating viewing or participation in a conference. User interface screen 1000 may operate to allow a user to control the operation of user interface screen 1000 via menu and selection buttons. Non-limiting examples of menu and selection buttons include file, edit, view, window and help menu selections and minimize screen, expand-to-full-screen, close screen and submit selection.

Figure 11:
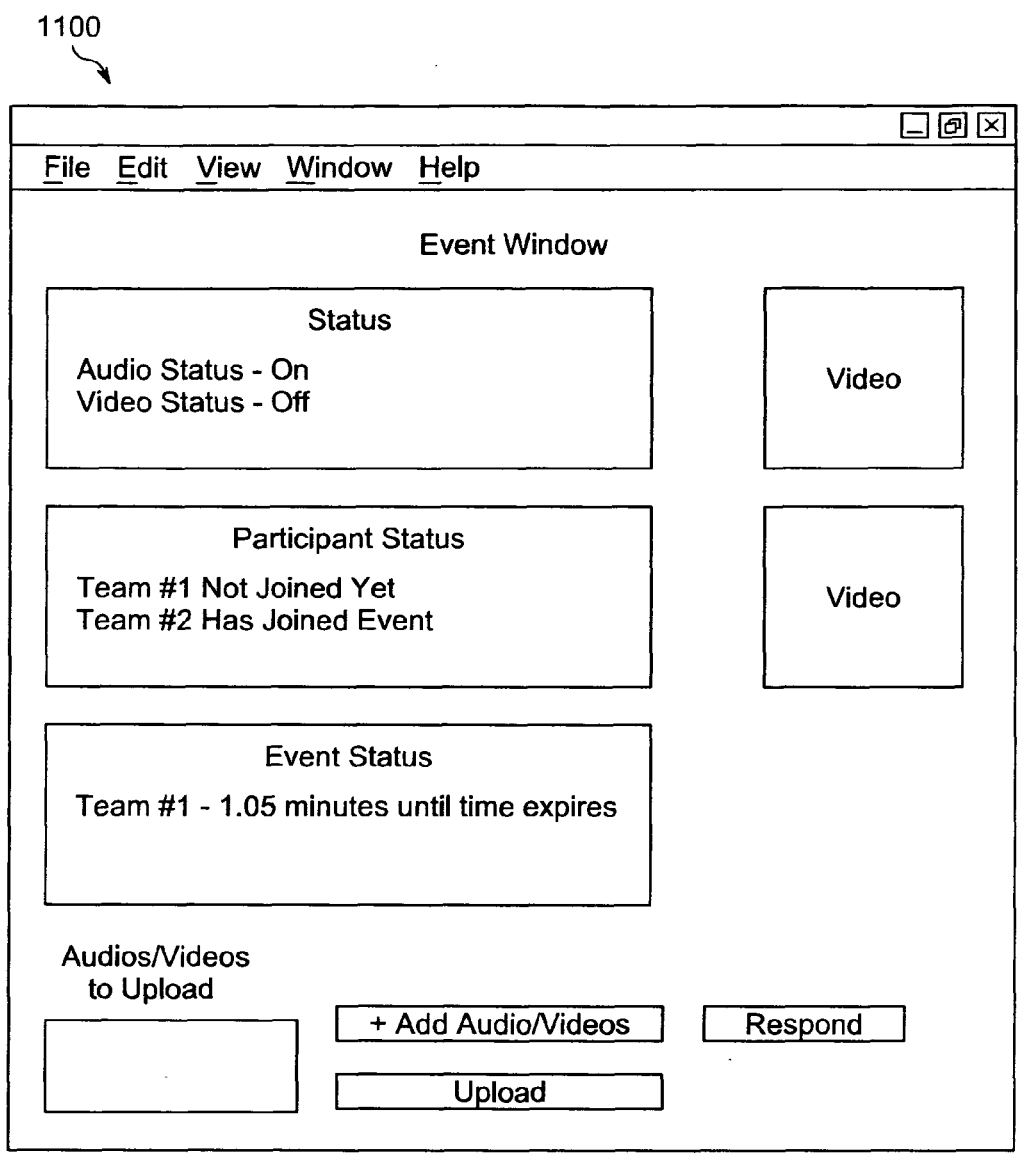
FIG. 11 illustrates an exemplary user interface screen which may be used by an exemplary web-enabled embodiment of the present invention for participating in a conference.

FIG. 11 illustrates an exemplary user interface screen 1100 which may be used by an exemplary smart-phone or web-enabled embodiment of the present invention for participating in a conference.

User interface screen 1100 may operate to allow a user to participate in a conference. Non-limiting examples of information which may be displayed to user include status, audio status, video status, video, participant status, conference status and entry locations for uploading audio and video. User interface screen 1100 may operate to allow a user to control the operation of user interface screen 1100 via menu and selection buttons. Non-limiting examples of menu and selection buttons include file, edit, view, window and help menu selections and minimize screen, expand-to-full-screen, close screen and upload selection.

Figure 11A:
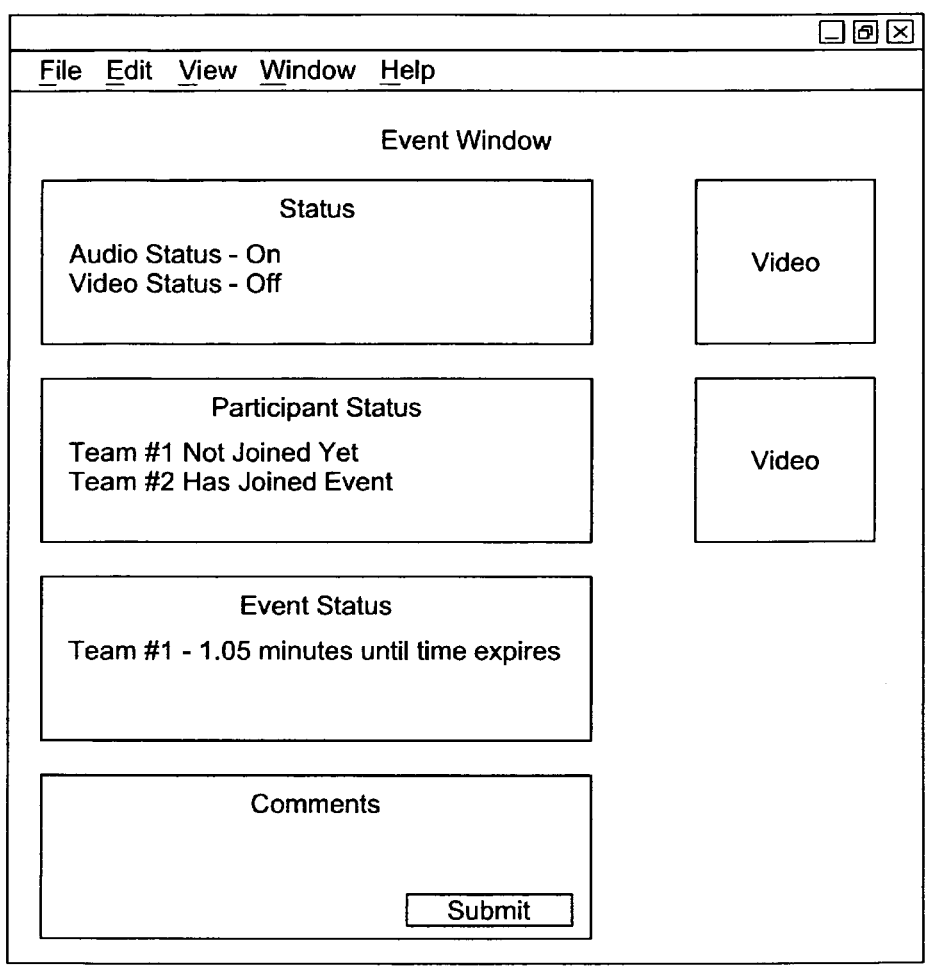
FIG. 11A illustrates another exemplary user interface screen which may be used by an exemplary web-enabled embodiment of the present invention for participating in a conference.

FIG. 11A illustrates an exemplary user interface screen 1200 which may be used by a smart-phone or exemplary web-enabled embodiment of the present invention for voting for a winner of a conference.

User interface screen 1110 may operate to allow a user to communicate with the Admin, and through the Admin to the Chair to submit responses and give user feedback. Non-limiting examples of information which may be displayed include; audio status, video status, participant status, conference status, video, group participants and radio selections for selecting a winning team. User interface screen 1110 may operate to allow a user to control the operation of user interface screen 1110 via menu and selection buttons. Non-limiting examples of menu and selection buttons include file, edit, view, window and help menu selections and minimize screen, expand-to-full-screen, close screen and submit selection.

Figure 12:
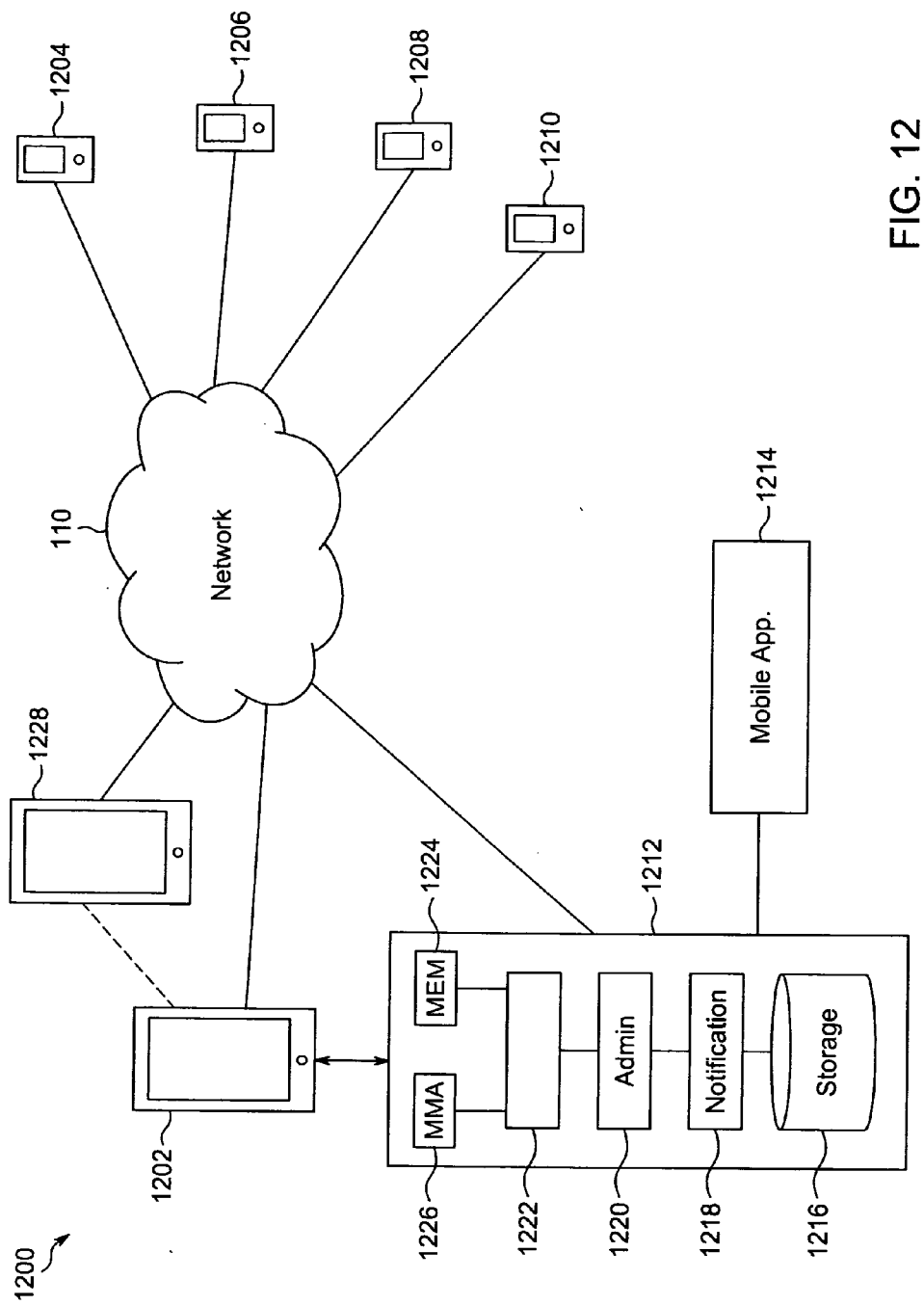
FIG. 12 illustrates an exemplary block diagram for a system for use in the present invention.

Referring now to FIG. 12, a more detailed block diagram depicting an exemplary system which may be used together with an exemplary embodiment of the present invention, which is shown generally at 1200. In this embodiment, a plurality of smartphones 1202, 1204, 1206, 1208, 1210 represent a plurality of users, for example, employees or officers of a global corporation. The system may further comprise a network 110, and server 1212.

In this exemplary embodiment of the present invention, the smartphones 1202-1210 may communicate bi-directionally through network 110. The smartphones may comprise various known hardware, software, and firmware. For example, the smart phones may comprise a CPU, a sensory representation (a visual, auditory, or tactile output such as a graphic display, a tone, or a vibration), a keyboard/touchpad, a microphone, a memory, a mass memory storage, a graphical user interface, a video camera, an input/output interface and a network interface.

Figure 13:
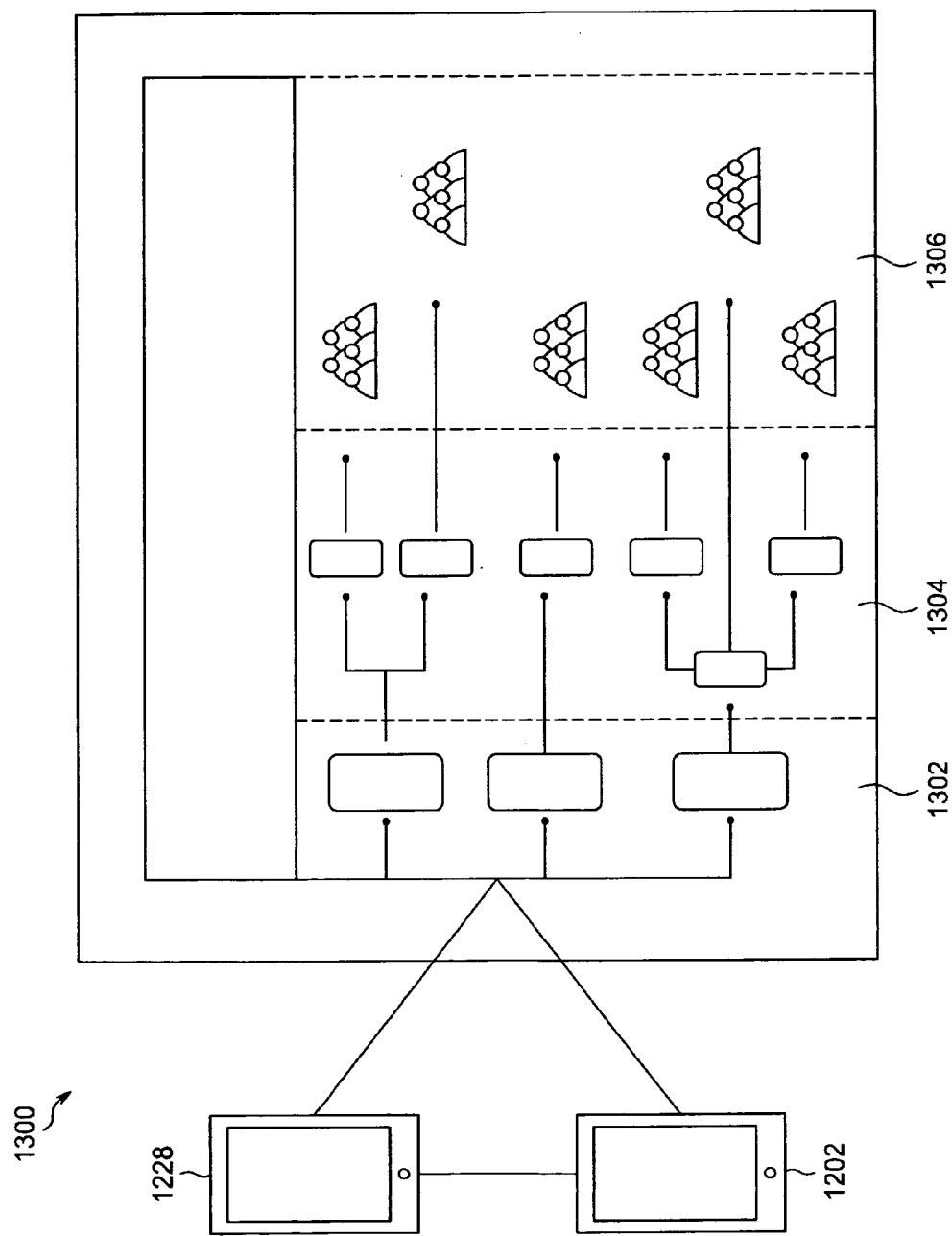
FIG. 13 illustrates a combination flow chart block diagram which may be used by an exemplary embodiment of the present invention.

Each of the smartphones 1202-1210 comprises a downloadable mobile application 1214 having dynamic content (e.g., computer program product) of that is integrated into the smart phones and enables asynchronous audio and video communication, which will be discussed in greater detail with relation to FIGS. 13-15. Examples of execution environments applicable with the present invention include Android, iOS, BlackBerry, HP webOS, Symbian OS, Bada from Samsung, and Windows Mobile. In optional embodiments of the present inventions, the mobile apps may be pre-installed on phones during manufacture, or delivered as web applications using server-side or client-side processing (e.g. JavaScript) to provide an "application-like" experience within a web browser. The mobile devices 1202-1210 comprise hardware, software and firmware and are configured to store and execute the applications when prompted by a user. It will be appreciated that any embodiments applicable to a mobile environment are further applicable to a desktop/laptop environment.

With reference still to FIG. 12, a system for communication in a mobile environment is provided. The system 1200 comprises a mobile application 1214 in communication with or integrated into server 1212. The server 1212 is in communication with each of the smartphones through network 1110. The server 1212 may comprise database storage 1216, which is configured to store data involving the application, e.g., user profile including job title, manager, business sector, certain permissions set by corporate and personal information including name, age, gender, location, email address and the like.

The mobile app 1214 may be used as an interface by each of the components on the server 1214, for example, notification module 1218, administration module (admin module) 1220, and cloud server 1222, and each of the smartphones 1202-1210. The mobile app 1214 may include specifications for routines, data structures, object classes, and variables, and may be implanted in any standard, for example, POSIX or vendor documentation such as the Microsoft Windows API, Standard Template Library in C++ or Java API. In optional embodiments, the database server be a stand-alone server and may comprise MySQL and rely exclusively on the client-server model for database access.

The server 1212, as noted above, may comprise storage module 1216, notification module 1218 admin module, cloud server 1222 and memory 1224 and 1226. In operation, the cloud server 1222 is configured to communicate with each of the smartphones over the network 110, to send and retrieve user data associated with any cloud-specific applications. In this regard, the cloud server is configured to further communicate user audio and video to and from each smartphone as appropriate.

An admin module 1220 may be further provided on the server 1212. The admin module is may be a function of phone 1202, which, in an exemplary embodiment, is under the control of a user who is a business Administrator (as used herein "Admin") or an Executive Assistant. As will be further described with relation to FIGS. 13-15, the Administrator using Admin module which shows as a GUI on phone 1202, has the ability, when authorized, to create an event or conference. For example, in an embodiment, the system may comprise role-based access control (RBAC), in which users are given access rights based on their roles. In a typical role-based system, the owner of the data classifies each data item, and defines which classifications are available to which group of users, the groups being defined by role, or roles. In the present invention, in an exemplary embodiment, the Administrator may have the ability and/or permissions to:

create an event;
participate in an event;
review submissions in response to a created event,
manage the event;
communicate on a separate communication channel with the event Chair 1228 (e.g., CEO. Team leader)' and
qualify certain persons or groups of persons for an event.

This list is not exhaustive. In optional embodiments of the present invention, the Administrator may, using the Admin module, perform any of the aforementioned steps whilst organizing a series of responses for the event Chair 1228. The storage module 1216 is configured to store video and audio that are submitted by the Chair 1228 and responders at devices 1204-1210.

The system and architecture as shown in FIGS. 1 and 12, in operation, facilitates controlled, asynchronous communication over the network 110. For example, as shown in FIG. 13, a corporate network of communication devices is shown representing users across various businesses and or groups at reference numeral 1300. In this exemplary embodiment, the Admin 1202, also referred to herein as "moderator", creates an event or conference. A notification is then sent to the Chair 1228. Chair 1228, which is in communication with admin module, has the ability to allow or deny the meeting request, review the teams or groups that Admin has selected for the event or conference. If the Chair approves the event or conference, the chair 1228 can record a video message, interview or the like, which when complete, is automatically sent to the Admin 1202 for review. The Admin 1202 can then send the video message to a chosen group or groups 1302, 1304, and 1306. In optional embodiments, depending upon permissions given by the role-based access control (RBAC), the system is configured to transmit the message to the appropriate users via separate and distinct communication channels, as needed. In other optional embodiments of the present invention, a user in user in group 1302 may have permissions to select which users that exist in less substantial roles are allowed to view the video and/or response. In this embodiment, there is substantial interactions between the companies RBAC and the system of the present invention, and as such, the system configured as fully integratable into RBACs.

FIGS. 14A-D illustrates operation of exemplary software which may be used by an exemplary web-enabled embodiment of the present invention.

Figure 14A:
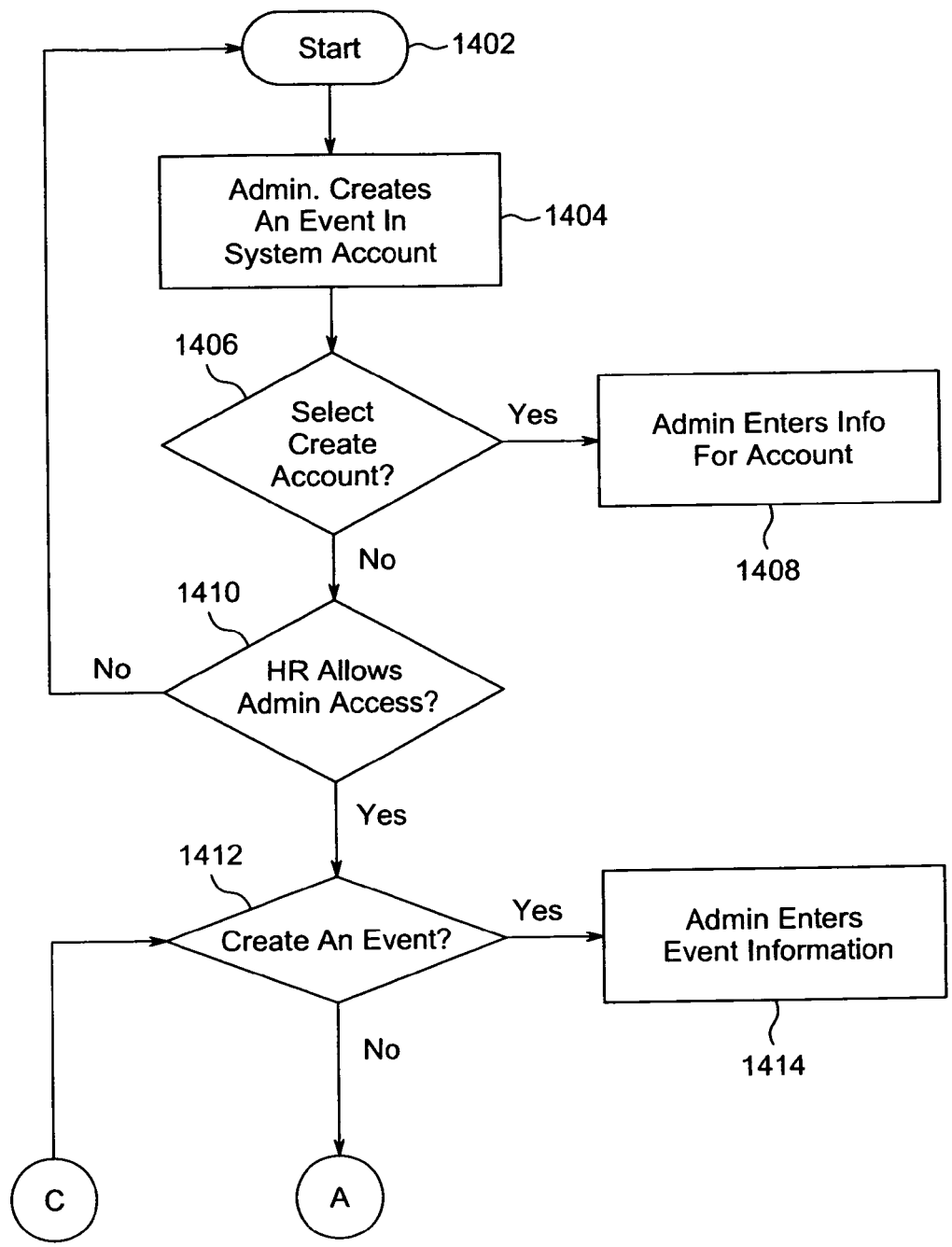
FIG. 14A illustrates a flow chart applicable to embodiments of the present invention.
Figure 14B:
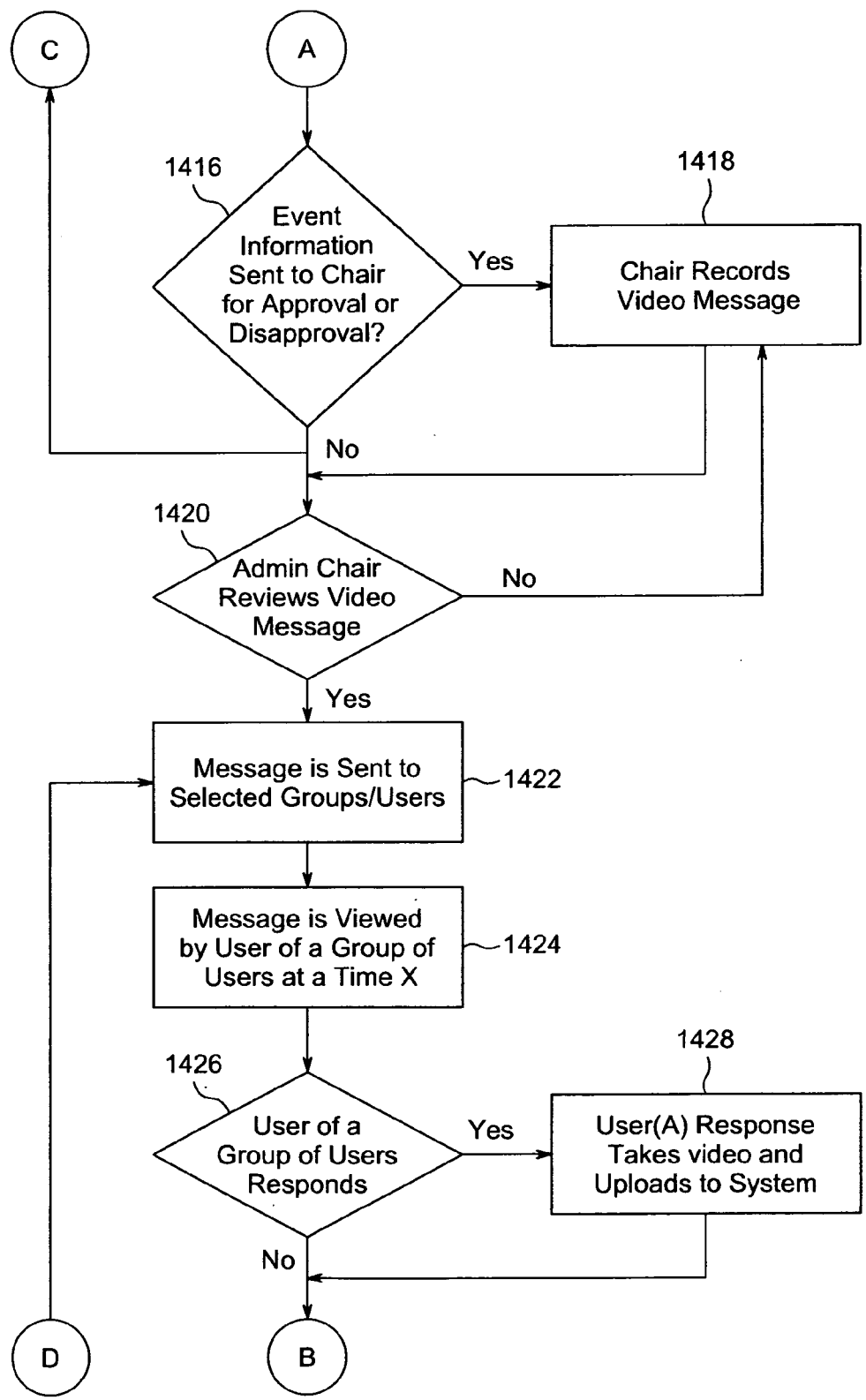
FIG. 14B illustrates a continuation of the flow chart of FIG. 14A applicable to embodiments of the present invention.
Figure 14C:
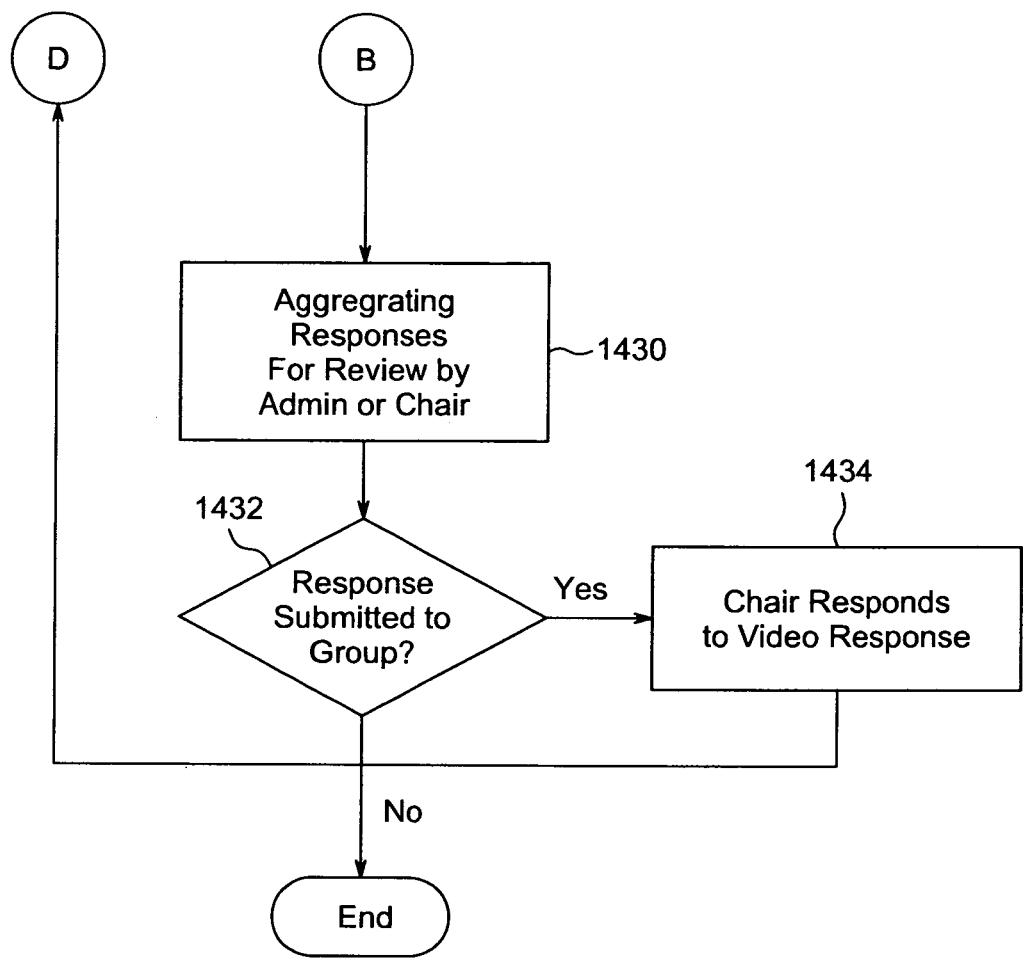
FIG. 14C illustrates a continuation of the flow chart of FIGS. 14A and 14B rt applicable to embodiments of the present invention.
Figure 15A:
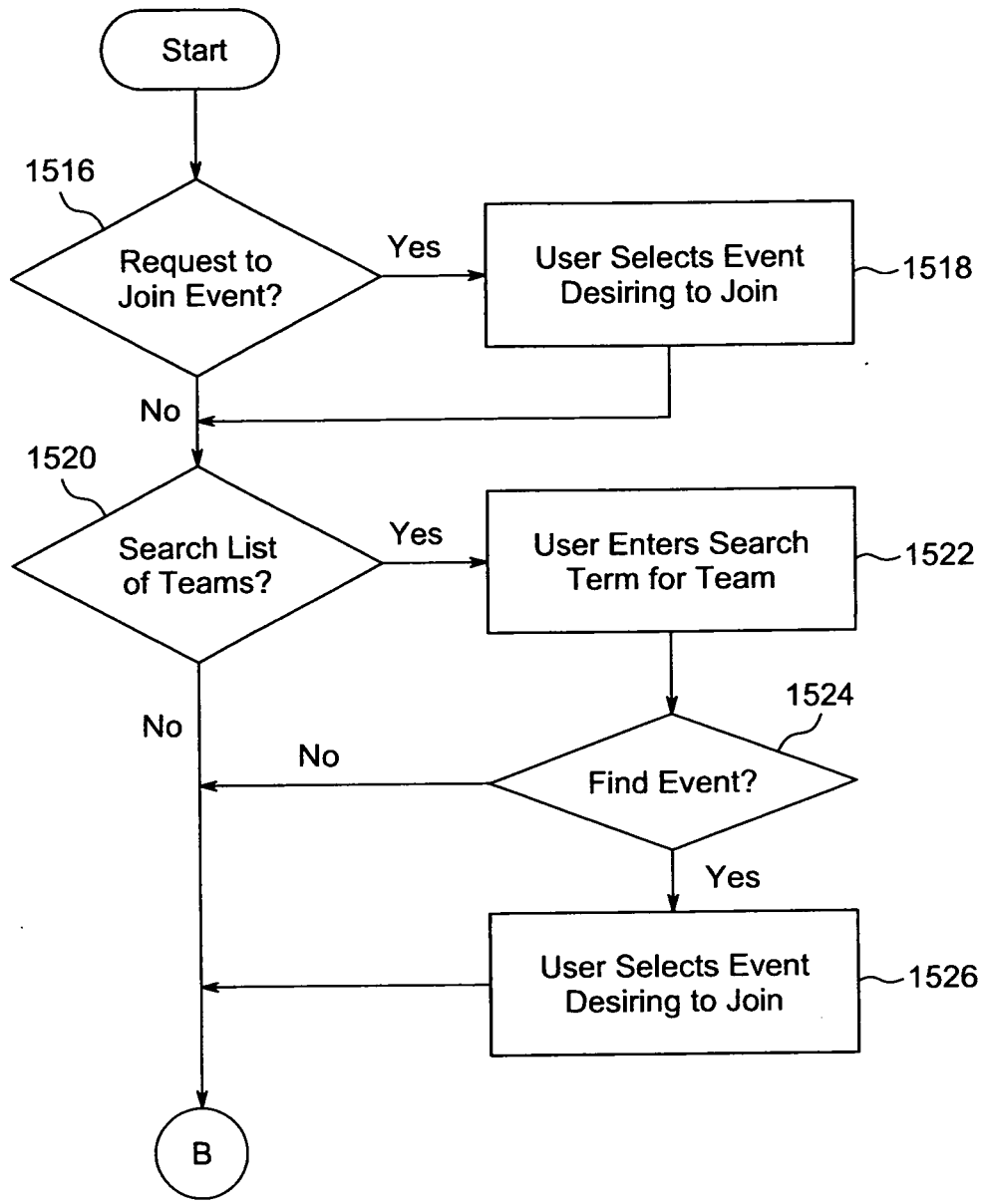
FIG. 15A illustrates a flow chart applicable to embodiments of the present invention.
Figure 15B:
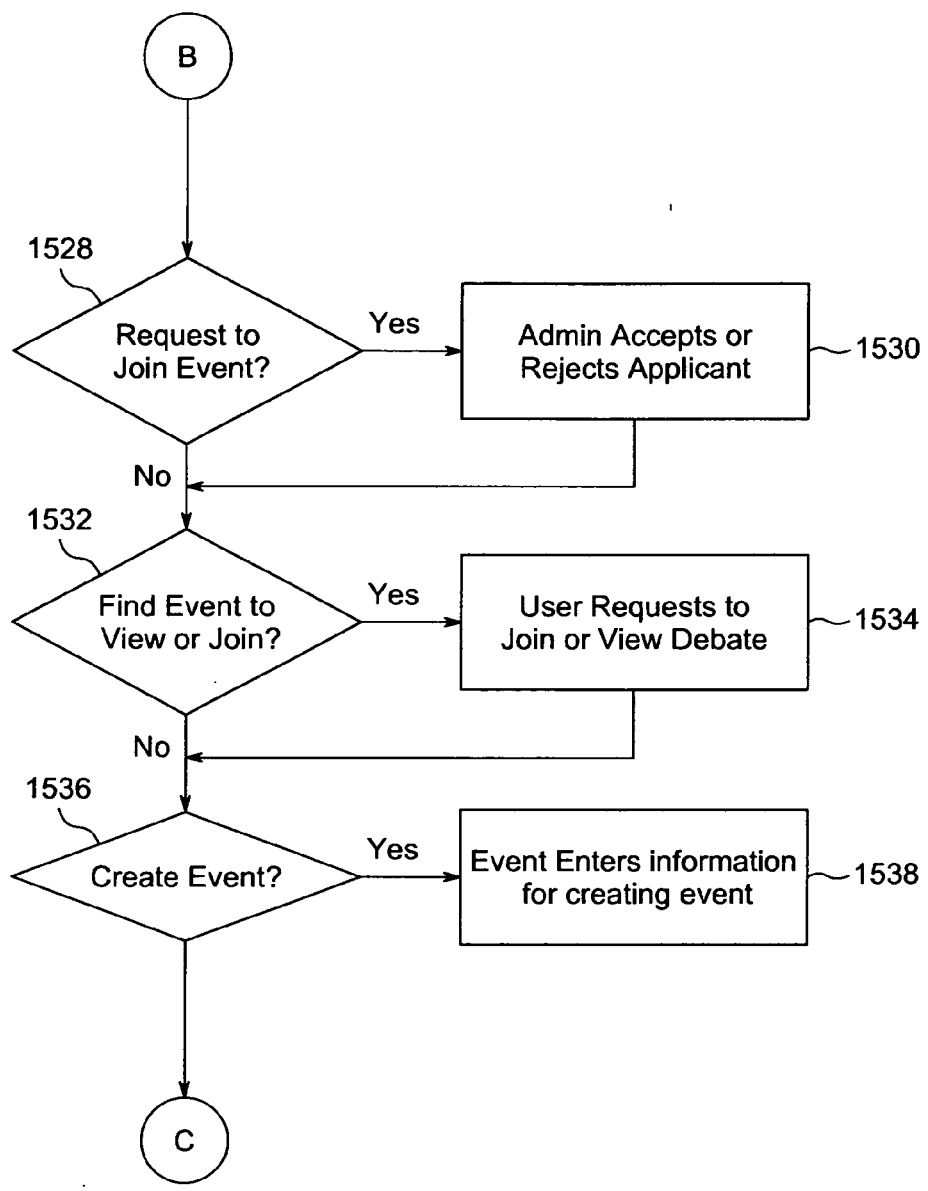
FIG. 15B illustrates a continuation of the flow chart of FIG. 15A applicable to embodiments of the present invention.
Figure 15C:
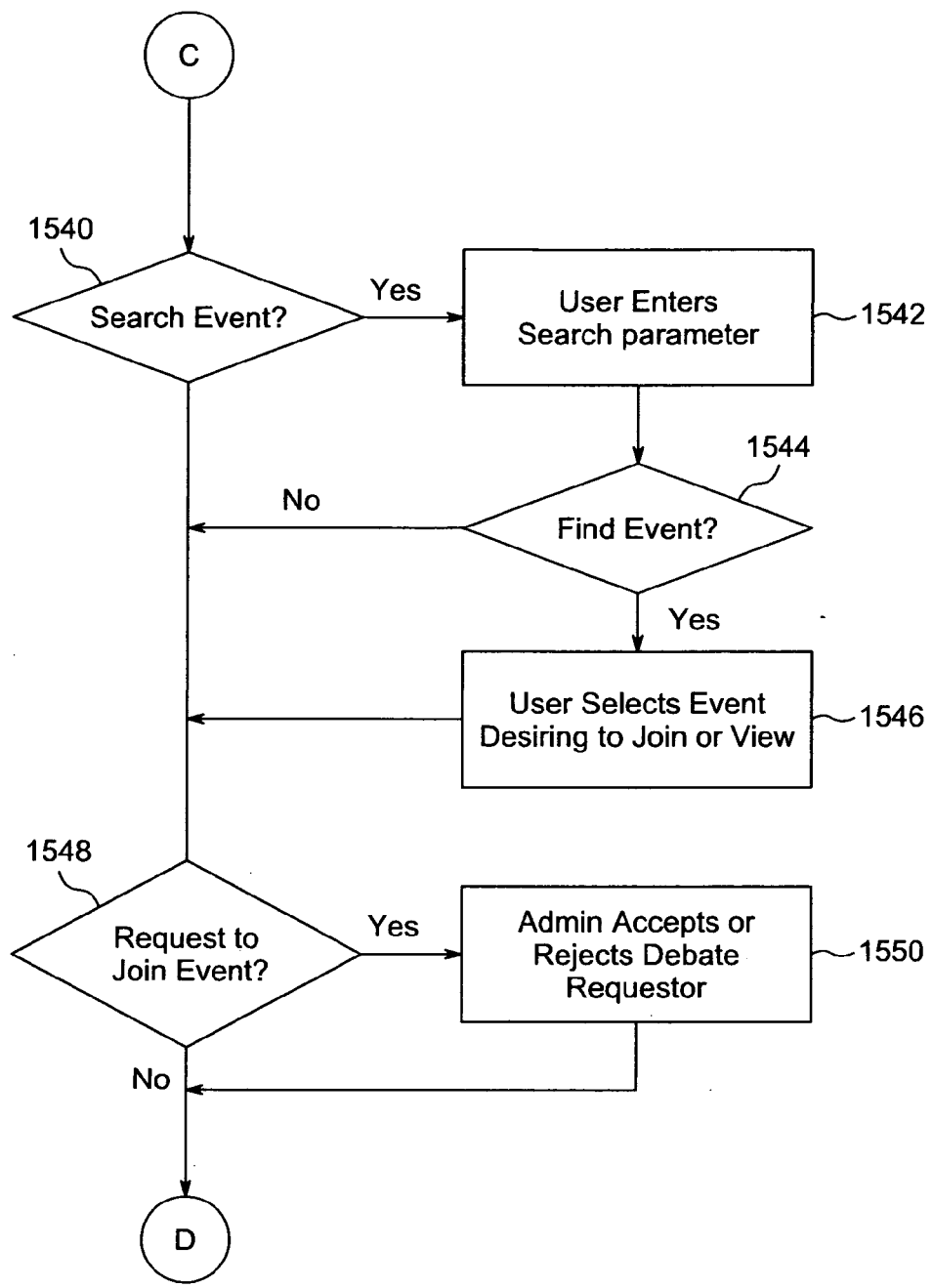
FIG. 15C illustrates a continuation of the flow chart of FIGS. 15A and 15B applicable to embodiments of the present invention.
Figure 15D:
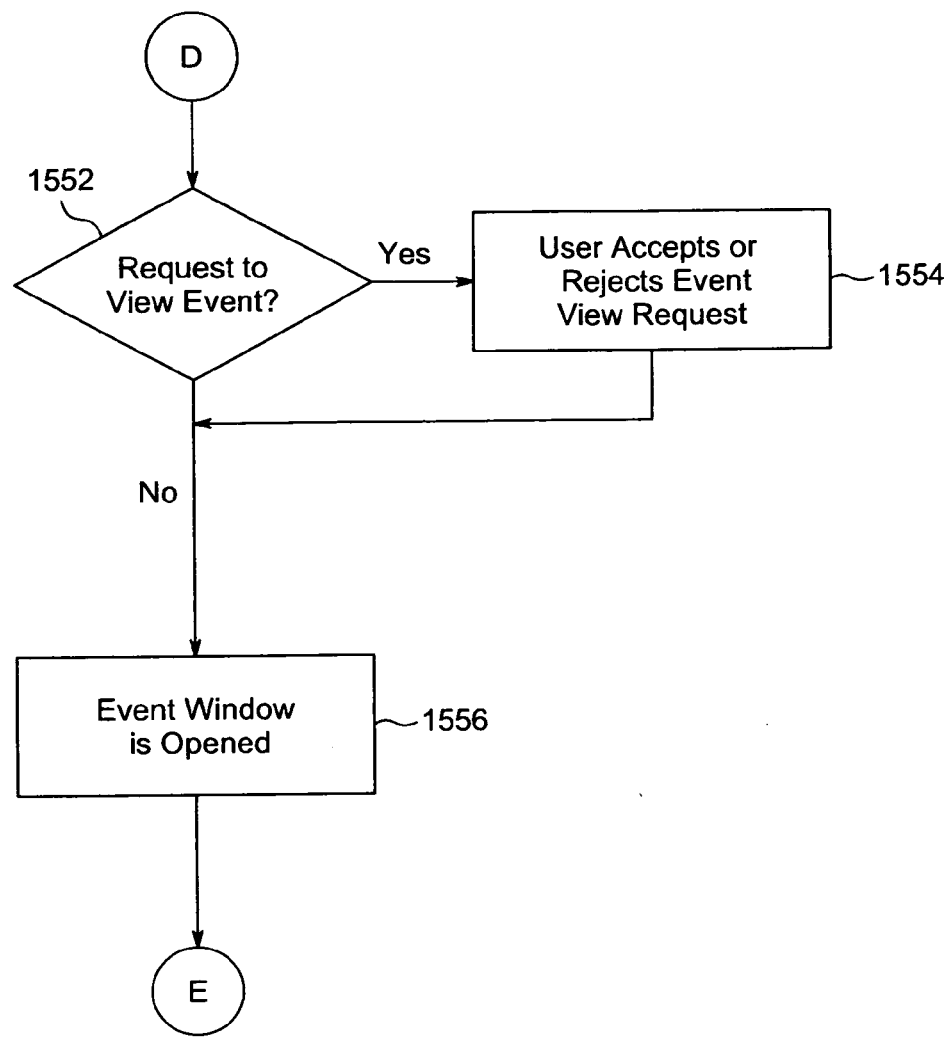
FIG. 15D illustrates a continuation of the flow chart of FIGS. 15A and 15B applicable to embodiments of the present invention.

FIGS. 14A-D is a flow chart 1400 illustrating an exemplary process for the execution of software in accordance with an embodiment of the present invention. In the present embodiment, the process initiates in a step 1402 (FIG. 14A). The software may be operable for instruction execution and storage of information on server 112, 1212 (FIGS. 1 and 12) and/or server 114 (FIG. 1). In a step 1404, Admin may be prompted on GUI 140 (FIG. 1) of client 102 (FIG. 1) to enter a user identification and password and may also be prompted to create an account (FIG. 2). Non-limiting examples of GUI is include computer monitor, cell phone display and television. The information which may be displayed to user via GUI 140 (FIG. 1) may initiate at server 112 (FIG. 1) and/or server 114 (FIG. 1) and may be transmitted to global network 110 (FIG. 1) via communication channel 124 (FIG. 1). The information may then transferred from global network 110 (FIG. 1) to local network 106 (FIG. 1) via communication channel 120 (FIG. 1). The information may then transferred from local network 106 (FIG. 1) to network interface 146

(FIG. 1) via communication channel 116 (FIG. 1). The information may then transferred from network interface 146 (FIG. 1) to GUI 140 (FIG. 1). The information may be transferred from network interface 146 (FIG. 1) to GUI 140 (FIG. 1) directly or with assistance from CPU 126. Information may be transferred from client 102 (FIG. 1) to server 112 (FIG. 1) and/or server 114 (FIG. 1) in the reverse process as previously discussed. If user has a prior established account, then the user may enter an identification and password.

In a step 1406 (FIG. 14A), it may be determined that Admin selects to create an account. If Admin selects to create an account, then in a step 1408 Admin may enter information for creating an account. Non-limiting examples of information for creating an account include user identification, password, first name, middle name, last name, street address, city, state, zip code, country, phone number, fax number, email address, security questions, credit card type, credit card number, credit card expiration month, credit card expiration year, credit card security code. Non-limiting examples of devices user may enter information include computer keyboard, computer pointing device, mobile communication device keypad and cellular telephone keypad. Non-limiting examples of devices user may enter information for this embodiment include keyboard 130 (FIG. 1) and pointing device 128 (FIG. 1). In a step 1410 (FIG. 14A), software may determine if user has entered the correct identification and password information. This may occur thorough the system setting permissions or the integration with internal software setting the permissions via human resources for example.

If Admin, or persons without proper permission enters incorrect user identification and password information and is allowed to create an account, operation of software may return to step 1402/1404. In a step 1412, the Admin, with appropriate permissions, it may be determined if a user seeks to create a new event. If Admin seeks to create a new event, then in a step 1414 user may enter information for creating a new group of users for the event (FIGS. 3A-B). Non-limiting examples of information which may be entered for creating a new group include business groups, description of teams within the business, type of groups and type of conferences.

In a step 1416 (FIG. 14B), the event information is forwarded to the event Chair for an appraisal of the event and the groups that the Admin selected for involvement. If the Chair determines that the event and participants is proper, the Chair can confirm meetings step 1416 and record a video message step 1418. In optional embodiment of the invention, the video can be recorded at a live conference and sent to satellite users automatically at the concurrence of an event with an approval from the Admin and/or Chair.

In step 1420, either the Admin or Chair may review the video message for approval. If the video recording is not sufficient or needs to be redone for any reason, the chair can re-record at step 1418. If the recording is sufficient, the Admin then may send the video to the users and/or team members step 1422, who may be in multiple time zones.

In step 1422, a user on the event list, the user receives the video. At step 1424, the message is viewed by a user of a group of users at a time X. In this way, many members from a team that are located in many different times zones across the globe are able to view the Chair's meeting. However, in the method and systems of the present invention, the system facilitates asynchronous and controlled communication from team members back to the chair and to each other over a predetermined period of time, as will be further explained with reference to FIG. 14. For example, if a user in location A may view the video at time X, while a user in location B may view the video may view the video at time Y, while a user in location C may view the video at time Z. In the Event information box, the Admin or Chair may set a time frame for response (e.g., 24 hours from receipt) for each or all users. Therefore, the users have a predetermined amount of time to responds to the message, while still having the ability to respond to a time that is of much more convenience than when the original message was recorded or sent.

At step 1426, a user of a group of users, for example, user 1204 (FIG. 12) may choose to respond, step 1428. If the user responds, the user may take a video message using his or her smartphone and upload it to the system.

At step 1430, (FIG. 14C) the system is configured to aggregate the response for convenient review of the responses by the Admin for submission to the Chair. The Admin can quickly and conveniently click through each of the responses to choose the most relevant or engaging response to which the Chair can then respond to. These responses are submitted to the queue in data storage module for the Chair to review at step 1432.

At step 1434, the Chair may respond to the any of the requests that were uploaded and queued by the Admin in the predetermined window of time in which the responses were uploaded. Now referring to FIG. 15A-D, in an exemplary embodiment of the present invention, a user may request to join an event or meeting and the events and meetings may be searchable by certain groups or set of users (or all users). If user seeks to join an existing event and has predetermined the event to join, then in a step 1518, user may select to join a team. In a step 1520, it may be determined if a user seeks to search for an event to join based on a set of search terms. If user seeks to search for an event using search terms, then in a step 1522 user may enter search terms for search. Then in a step 1524, user may be presented with a list of existing event matching the search terms and if user finds an event or group to join, then in a step 1526 user may select to join a team or multiple teams (FIG. 4). In a step 1528, it may be determined if other entities seek to join an event created by Admin. If there are requests to join user's event, then in a step 1530 user may accept or reject applicants seeking to join an event created by user (FIG. 5). In a step 1532, it may be determined if user seeks to find a conference or conferences to view or join. If user is seeking to view or join a conference or conferences, then in a step 1534 user may request to join or view a conference or conferences. In a step 1536, it may be determined if a user seeks to create a new conference. If a user seeks to create a new conference, then in a step 1538 user may enter information for creating a new conference. Non-limiting examples of information which may be entered for creating a new conference include name of conference, description of conference and type of conference.

In a step 1540 (FIG. 15C), it may be determined if user seeks to search for conferences to view or join. If user seeks to search for a conference to view or join, then in a step 1542 the user may enter search terms for finding a suitable conference or conferences. In a existing event matching the search terms and if user finds an event or group to join, then in a step 1526 user may select to join a team or multiple teams (FIG. 4). In a step 1528, it may be determined if other entities seek to join an event created by Admin. If there are requests to join user's event, then in a step 1530 user may accept or reject applicants seeking to join an event created by user (FIG. 5). In a step 1532, it may be determined if user seeks to find a conference or conferences to view or join.

If user is seeking to view or join a conference or conferences, then in a step 1534 user may request to join or view a conference or conferences. In a step 1536, it may be determined if a user seeks to create a new conference. If a user seeks to create a new conference, then in a step 1538 user may enter information for creating a new conference (FIGS. 6A-B). Non-limiting examples of information which may be entered for creating a new conference include name of conference, description of conference and type of conference.

In a step 1540 (FIG. 13D), it may be determined if user seeks to search for conferences to view or join. If user seeks to search for a conference to view or join, then in a step 1542 the user may enter search terms for finding a suitable conference or conferences. In a step 1544, a user may be presented with a list of conferences matching the search terms submitted in step 1542. If user finds a conference or conferences deemed desirable to view or join, then in a step 1546 the user may request to join or view a conference or conferences (FIG. 7).

In a step 1548, it may be determined if an outside entity has requested to join a conference or conferences created by user. An outside entity may be configured to access software via client 104 (FIG. 1), for example. If outside entities have requested to join a conference or conferences created by user, then in a step 1550 the Admin may accept or reject conference applicants (FIG. 8). In a step 1552, it may be determined if an outside entity has requested to view a conference or conferences created by user.

If an outside entity has requested to view a conference or conferences created by user, then in a step 1554 the user may accept or reject applicants for viewing a conference (FIG. 9). In a step 1556, user may open a window for interface, control and operation of the portion of the conference for which the user may participate or view (FIG. 10).

In a step 1558, it may be determined if user may upload media. User may create media for upload using microphone 132 (FIG. 1) and video camera 142 (FIG. 1). If user seeks to upload media, then in a step 1560 user may enter information for uploading media. In a step 1562, it may be determined if a user may listen to audio and/or view video or other media. If it is determined that user may listen to audio and/or view video, then in a step 1564 user may listen to audio and/or view video or other media as appropriate. In a step 1566, it may be determined if the conference has completed. If the conference has not completed, then operation of the software may transition to step 1558. If the conference has completed, then in a step 1568 it may be determined if user may vote. If user is to vote, then in a step 1570 the user may enter a vote. Operation of software may terminate in a step 1572.

In yet another embodiment of the present invention, instead of the uploaded video, live video internet broadcast, or webcast is configured and used according to techniques known to those skilled in the art.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

Having fully described at least one embodiment of the present invention, other equivalent or alternative methods of global network interaction for performing conferences according to the present invention will be apparent to those skilled in the art. The invention has been described above by way of illustration, and the specific embodiments disclosed are not intended to limit the invention to the particular forms disclosed. For example, the particular implementation of performing a globally networked conference may vary depending upon the particular type client or conference used. The clients and conferences described in the foregoing were directed to conventional formal conferences using conventional computing and network devices; however, similar techniques may be provided using other types of devices such as televisions and game systems. Implementations of the present invention made for devices other than conventional computing and network devices are contemplated as within the scope of the present invention. The invention is thus to cover all modifications, equivalents, and alternatives falling within the spirit and scope of the following claims.

What is claimed is:

1. A method for controlled communication over a network executed by one or more computing processors, the method comprising:

providing an administrator graphical user interface (GUI) in communication with at least a first user GUI and second user GUI over the network;

receiving a request to join a conference from the first user GUI using a first channel;

verifying, using a first tab on the administrator GUI, that the first user is authorized to join a conference;

sending permission, using a second tab from the administrator GUI, to the first user GUI to join the conference and sending further permission to a first user at the first user GUI, if further verified, to create and upload a first media over the first channel;

receiving and storing the first media on a server, wherein the first media is sortable on the server;

reviewing, using the administrator GUI, the first media upload, and if the first media upload meets a first predetermined standard, making available, on the server, the first media upload to the second user at the second user GUI;

reviewing, on the second GUI by the second user, the first media upload during a first predetermined amount of time, wherein the first media upload is viewed over a second channel;

receiving and storing a second media upload on the server, wherein the second media upload is sortable on the server, wherein the second media upload is created by the second user and sent to the server over the second channel;

reviewing, at the administrator GUI, the second media upload from the second user and if the second media upload meets a second predetermined standard, making available, on the server, the second media upload to the first user;

reviewing, on the first GUI by the first user, the second media upload during a second predetermined amount of time, wherein the second media upload media is viewed over the first channel; and aggregating, on the server, the first and second media uploads for review at the administrator GUI and the second GUI.

2. The method of claim 1, wherein the administrator GUI, the first GUI and the second GUI are integrated into a mobile application.

3. The method of claim 1, wherein providing an administrator GUI comprises managing permissions from a role-based access control system(RBAC), the RBAC configured to give permissions for at least one of creating the event, participation in the event, reviewing media uploads for the event, qualification of users, and managing the event.

4. The method of claim 1, wherein the server is configured to store, for a third predetermined amount of time, a third media upload for viewing by the first or second user.

5. A system for controlled communication over a network executed by one or more computing processors, the system comprising:

an administrator graphical user interface (GUI) in communication with a least a first user GUI and a second user GUI over the network, each first and second user GUIs representing first and second users, respectively;

a first channel and a second channel on the network in communication with the administrator GUI, the first user GUI and the second user GUI;

a server in communication with the network, the administrator GUI, the first user GUI and the second user GUI;

wherein the system is configured to:

receive a request to join a conference at the administrator GUI from the first user GUI using a first channel;

verify, using a first tab on the administrator GUI, that the first user is authorized to join a conference;

send permission, using a second tab from the administrator GUI, to the first user GUI, to join the conference and send further permission to the first user, if further verified, to create and upload a first media over a first channel;

receive and store the first media upload on the server, wherein the first media upload is sortable on the server;

review, using the administrator GUI, the first media upload, and if the first media upload meets a first predetermined standard, make available, on the server, the first media to the second user;

review, on the second GUI by the second user, the first media upload during a first predetermined amount of time, wherein the first media upload is viewed over a second channel;

receive and store a second media upload on the server, wherein the second media upload is sortable on the server, wherein the second media upload is created by the second user and sent to the server over the second channel;

review, at the administrator GUI, the second media upload from the second user and if the second media upload meets a second predetermined standard, make available, on the server, the second media upload to the first user;

review, on the first GUI by the first user, the second media upload during a second predetermined amount of time, wherein the second media upload is viewed over the first channel;

aggregate, on the server, the first and second media uploads for review at the administrator GUI and the second GUI.

6. The system of claim 5, wherein the administrator GUI, the first GUI and the second GUI are integrated into a mobile application.

7. The system of claim 5, further comprising a role-based access control system (RBAC), the RBAC configured to give permissions to the administrator GUI for at least one of creating the event, participation in the event, reviewing media uploads for the event, qualification of users, and managing the event.

8. The method of claim 6, wherein the server is configured to store, for a third predetermined amount of time, a third media upload for viewing by the first or second user.

* * * * *